Patented May 23, 1933

1,911,139

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

PREMOLDED EXPANSION JOINT PREPARED FROM BITUMINOUS RUBBER SUBSTITUTES

No Drawing.    Application filed December 26, 1925.   Serial No. 77,876.

My invention relates in general to an improved material formed principally of bituminous rubber substitutes and particularly adapted to form expansion joints. More specifically, my invention relates to the provision of improved expansion joint material having rubbery qualities and which may be prepared in relatively inexpensive mechanical mixers, rather than on the more expensive masticating rollers, and which when cold may have all the desirable qualities of rubber.

The exceedingly high price of pure rubber makes it necessary to adulterate with fusible materials derived from the animal, vegetable, or mineral kingdom. Resins, animal or vegetable oils and fats, animal and vegetable waxes, compounded with bituminous material, are frequently employed, including such materials as 1. Ozokerite and paraffine wax
2. Hard native asphalts
3. Asphaltites either used alone or fluxed
4. Blown petroleum asphalt
5. Wurtzilite asphalt
6. Rosin pitch
7. Fatty acid pitches
8. Special products including chlorinated napthalene, etc.

The bituminous materials are utilized as distributors or carriers of the cheaper products, and in some cases are used to soften the rubber, and in others to increase its weather resisting properties.

These substitutes, known in some cases as mineral rubber or factis, are at present incorporated with the raw rubber on masticating rollers, utilized in the art, heated by steam or cooled with water. One method consists in first combining the substitute namely mineral rubber with reclaimed rubber and mineral fillers on the rolls and then adding it to the raw rubber, or the raw rubber may have the mineral fillers added directly. The raw rubber is masticated a short time, the bituminous mixture being gradually worked into the mass usually less than 10% of the substitute being combined with the raw rubber, while it is still warm from the masticating process, and the composition is finally treated with vulcanizing agents or not, as may be desired.

The adulterants which are likely to be most suitable are

1. Materials which of themselves possess rubber-like properties, including a certain degree of toughness, resiliency, tenacity and ductility, as for example, gilsonite combinations, wurtzilite asphalt, blown petroleum asphalt, and certain of the fatty acid pitches.
2. Bituminous substances which are capable of being hardened and toughened by the sulphur used in the vulcanization process. To this class belong gilsonite combinations, wurtzilite asphalt and fatty acid pitches.

The use of certain bituminous materials actually improves the plasticity and insulative properties of the rubber, when added in small percentages. Sometimes the bituminous product is partially vulcanized before it is combined with the rubber mixture.

This process is usually accomplished on heated masticating rollers and the rubber becomes less and less workable as the adulterants are added, the mass being finally removed from the rolls in sheet form after which it may be cut up manually or otherwise into desired size and shape.

My invention resides in providing a mixture which can be handled in a mechanical mixer and in not carrying the processes beyond the point where the bituminous mixtures still are workable, so that the mixtures can be transferred from the mechanical mixers to pressing rolls and rolled down to sheet form of desired thickness and later cut into strips suitable for use as expansion joints while still workable.

I am thus able to produce from a single mixture pre-formed expansion joint fillers of various thicknesses and to obtain these various desired thicknesses from the same batch of material.

A suitable formula for this purpose is gilsonite asphalt five (5) per cent, blown bituminous matter seventy (70) per cent and twenty-five (25) per cent of a mixture composed of ten (10) per cent rubber, cut back with a suitable solvent, such as naphtha, ten (10) per cent cotton-seed pitch and five (5) per cent sulphur. Numerous combinations of the various materials enumerated may be made, and this formula is specified as a preferred example only for the purpose of illustrating my invention. Also, there are many types of vulcanizing agents and vulcanizing accelerators such as sulphur, aniline, paratoluidine, aldehyde, ammonia, or quinoidine which may be employed and which are well known to the art. The purpose of using pitch or an equivalent material, such as, vegetable oil, animal oil or mineral oil, is to increase the toughness, resiliency and tenacity of the bituminous material used.

It is desirable that the mass be incorporated in a mechanical steam heated mixer, and the batch presented to reducing rolls which form this material into sheets which are finally cut into strips. To the material while mixing may be added mineral fillers, such as, limestone dust, magnesia powder, diatomaceous earth, fuller's earth, etc., and these may be incorporated in the main body or may be incorporated in the twenty-five (25) per cent mixture, to aid in reducing the mixture to proper consistency. Likewise the rubber employed may be either smoked sheet, raw, uncoagulated rubber, or it may be crude rubber of various descriptions, or reclaimed rubber.

My invention relates to utilizing a material of this kind because the penetrating power of the material is controlled by the adhesion and close amalgamation of the molecules of the mass, retarding penetration of any porous material which might be introduced.

My invention relates to mixing in this mass, which would be employed to the extent of approximately seventy-five (75) to eighty-five (85) per cent, fifteen (15) to twenty-five (25) per cent of cellular, unpenetrated, fibrous material, either in a coarse or finely divided state. This is accomplished by the mixing devices described, and after the mixture is coordinated it is pressed between rolls and reduced to sheets and cut into strips adapted for use as preformed expansion joints.

I claim:

1. A composition of matter comprising a mixture of five (5) per cent gilsonite asphalt, seventy (70) per cent blown bituminous matter and twenty-five (25) per cent of a mixture composed of ten (10) per cent rubber, cut back with a suitable solvent, ten (10) per cent cotton-seed pitch and five (5) per cent sulphur, adapted for use as a binder for premolded expansion joints.

2. A composition of matter comprising blown bituminous matter, combined with a mixture of rubber, cotton-seed pitch, and sulphur, all of which are mixed to form a resilient ductile mass.

3. A composition of matter comprising a blown bituminous substance and fibrous material, combined with a mixture of rubber, cotton-seed pitch and sulphur, all of which are mixed to form a resilient ductile mass.

Signed at Chicago, Illinois, this 16th day of December, A. D. 1925.

ALBERT C. FISCHER.